United States Patent [19]

Goebel

[11] Patent Number: 4,694,875
[45] Date of Patent: Sep. 22, 1987

[54] TIRE-MOUNTING APPARATUS

[75] Inventor: Eickhart Goebel, Pfungstadt, Fed. Rep. of Germany

[73] Assignee: Gebr. Hofmann GmbH & Co. Kg Maschinenfabrik, Pfungstadt, Fed. Rep. of Germany

[21] Appl. No.: 692,425

[22] Filed: Jan. 18, 1985

[30] Foreign Application Priority Data

Jan. 18, 1984 [DE] Fed. Rep. of Germany ....... 3401476

[51] Int. Cl.$^4$ ............................................ B60C 25/10
[52] U.S. Cl. .................................... 157/1.24; 157/1.17
[58] Field of Search ................. 157/1, 1.17, 1.22, 1.24

[56] References Cited

U.S. PATENT DOCUMENTS

| 3,522,832 | 8/1970 | Held et al. | 157/1.22 |
| 3,942,575 | 3/1976 | Blomgren et al. | 157/1.17 X |
| 4,061,173 | 12/1977 | Daly | 157/1.24 X |
| 4,610,288 | 9/1986 | Huinink et al. | 157/1.22 |

FOREIGN PATENT DOCUMENTS

| 830303 | 2/1952 | Fed. Rep. of Germany | 157/1.24 |
| 1333160 | 6/1963 | France | 157/1.24 |

Primary Examiner—Frederick R. Schmidt
Assistant Examiner—Debra S. Meislin
Attorney, Agent, or Firm—Fleit, Jacobson, Cohn & Price

[57]  ABSTRACT

A tire-mounting apparatus for mounting a tire having two beads on a rim in a tire/rim assembly where the rim has two opposed flanges that are bent radially inwards to define a drop center, and where the beads of the tire extend over the rim and are located behind the rim flanges in the drop center. The apparatus includes a base on which a rim-mounting adaptor is rotatably mounted. A clamp is used to retain the beads of the tire on the rim. A mounting tool forces one of the tire beads over one of the rim flanges. The mounting tool is rotatably driven to move the tire and the rim so that the one tire bead is rolled over the one rim flange into the drop center of the rim.

18 Claims, 5 Drawing Figures

TIRE-MOUNTING APPARATUS

BACKGROUND OF THE INVENTION

The invention relates to a tire-mounting device, generally, and to a tire-mounting device including a rotary rim adaptor and a mounting tool displaceably fitted on a post.

DESCRIPTION OF PRIOR ART

The "Gummibereifung" magazine, 60th year, January 1984, pages 62-65, features a new tire/rim assembly where the tire is seated on the radial inner side of the rim. This means that the tire extends over the rim and is located behind the rim flanges, which are bent radially inwards. Conventional tire-mounting machines are not suited to mount a tire on this type of new tire/rim assembly. Because this new tire/rim assembly is becoming more widely accepted, there is a need for a device for mounting the tire onto the rim. The present invention is directed toward filling that need.

SUMMARY OF THE INVENTION

It is a primary object of the present invention to provide for a tire-mounting device able and suited for quickly mounting a tire onto a rim, where the tire is to be seated on the radial inner side of the rim.

The tire-mounting apparatus, according to the teachings of the present invention, mounts a tire having two beads on a rim in a tire/rim assembly where the rim has two opposed flanges that are bent radially inwards to define a drop center. The beads of the tire extend over the rim and are located behind the rim flanges in the drop center. The apparatus includes a base on which is rotatably mounted a rim adapter for receiving the rim. A clamping device retains the beads of the tire on the rim. A mounting assembly contains a mounting tool which forces one of the tire beads over one of the rim flanges. A motor rotates the mounting tool for moving the tire and rim in contact with the mounting tool so that the chosen tire bead is rolled over the rim flange into the drop center of the rim.

The primary advantage obtained by use of the inventive mounting device is that the driven mounting tool rolls the tire bead over the rim flange into the drop center of the rim.

A braking device applied to the rim adaptor provides for the torque difference between the mounting tool and the tire, which is required for tire mounting. In order to prevent the tire from slipping along the rim when mounted, the tire bead is clamped onto the rim in at least one position.

DESCRIPTION OF THE PREFERRED EMBODIMENT

Figure 1:
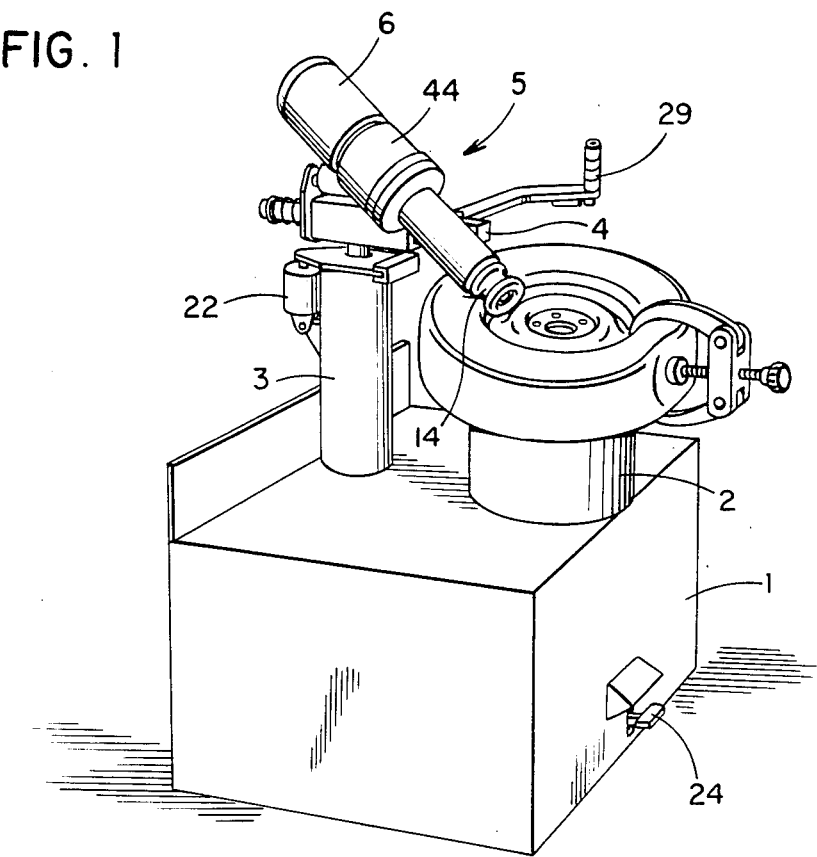
FIG. 1 is a schematic perspective view of a tire-mounting machine embodying the teachings of the present invention.

In describing the preferred embodiment of the invention illustrated in the drawings, specific terminology will be resorted to for the sake of clarity; however, it is not intended that the invention be limited to the specific terms so selected, and it is to be understood that each specific term includes all technical equivalents which operate in a similar manner to accomplish a similar purpose.

Figure 2:
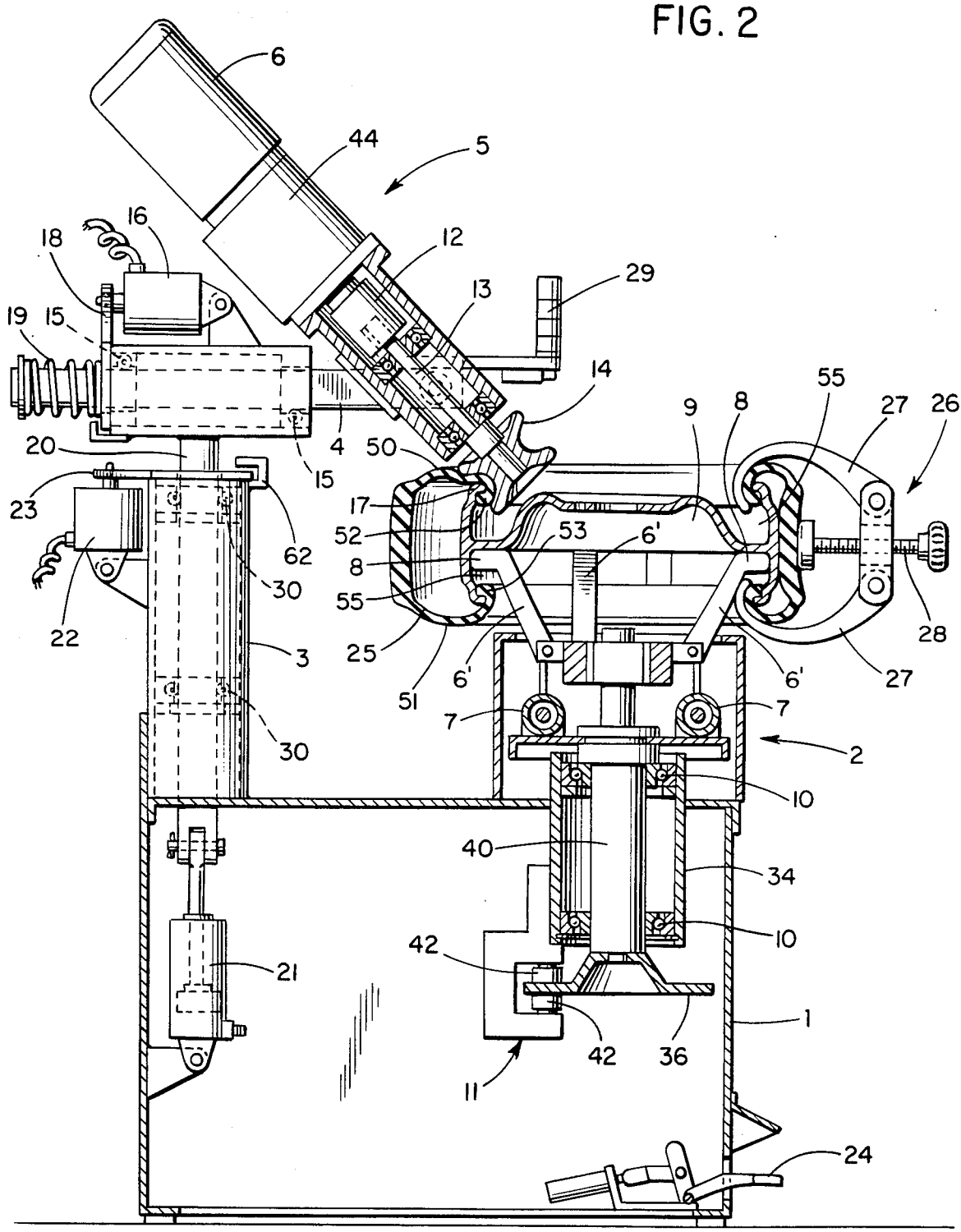
FIG. 2 is a side view generally in cross section through the tire and post of the tire mounting machine of FIG. 1.

With reference to FIGS. 1 and 2, the mounting device consists of a base frame 1 supporting a rim adaptor 2 and, at one side, an elongated, upwardly extending post 3 to guide a horizontally movable mounting arm 4. The mounting arm 4 is provided with a mounting-head assembly 5.

The rim adaptor 2 comprises preferably three or four clamping arms 6' which are moved in radial direction by means of a hydraulic or pneumatic cylinder assembly 7 associated with each arm. At their outer extremity, the clamping arms 6' have clamping elements 8 for accommodation of the rim 9. The rim may also be held by a wheel-engaging apparatus such as that shown and described in U.S. Pat. No. 4,061,173 (Daly). Finally, the rim 9 may also be clamped by a known, central clamping unit which is applied to the center bore of the rim. One such clamping unit is shown in U.S. Pat. No. 3,742,766 (Mitchell).

Furthermore, the rim adaptor 2 contains a downwardly extending shaft 40 that is rotatably supported in ball bearings 10 found in a support chamber 34 mounted in said base frame 1. Positioned at the bottom of said chamber 34 is a braking device 11 preferably in form of a disc brake, that includes friction pads 42 which perform a braking action on a brake disc 36, secured to the bottom of shaft 3240. The braking device could also be in the form of plain bearings having a given friction coefficient.

The mounting head assembly 5 includes a drive unit 6 preferably in the form of an electric motor with a gear unit 44 secured to the rotating shaft of the motor. A shaft coupling 12 secures the shaft of the motor to a drive shaft 13 connected to a mounting tool 14. The mounting tool 14 is a double-tapered roll, as shown in FIG. 2. It is also contemplated that the mounting tool may take the form of a tapered roll generally in the shape of a cone. One such tapered roll is shown and described in U.S. Pat. No. 3,866,655 (Holladay).

The mounting head assembly 5 is supported on the mounting arm 4 and can be displaced in a horizontal direction along a displacement axis by hand or by means of a drive unit. In order to accomplish horizontal displacement, the mounting arm 4 is supported on guide rollers 15. A horizontally positioned hydraulic or pneumatic pressure cylinder 16 combined with a planar clamping plate 18 presses the mounting tool 14 to move in the direction of the rim flange 17 of rim 9. After the pressure has been released in cylinder 16, a compression spring 19 secured to the rear of the mounting arm 4 restores the clamping plate 18 to its initial position, thus releasing the mounting arm 4 so that the mounting head assembly 5 is free to move.

Within the hollow post 3, a column member 20 is guided up and down in a vertical direction by means of guide rollers 30 and moved by means of the lowering hydraulic or pneumatic cylinder 21. The cylinder 21 is operated at constant pressure which is controlled so as to compensate for the weight of the whole mounting head assembly, thus permitting easy and quick adjustment of the mounting head assembly 5 to accommodate different wheel widths. A second hydraulic or pneumatic clamping cylinder 22 locks the column 20 together with a planar clamping plate 23. A return spring, which is not shown, can be used to reset the clamping plate 23 to its initial position in a manner similar to that of spring 19 and clamping plate 18. The cylinders 7, 16, 21, and 22 can be controlled in known manner by operation of respective pedals 24 and/or rotary switches 29. The pedals 24 and hand adjusters 29 are used to control the amount of hydraulic or pneumatic fluid delivered to the various cylinders to carry out the functions performed by the various cylinders. The various cylinders may be connected to the pedals and switches in any number of ways to accommodate the desires of the end user.

After insertion of the rim 9 into the tire 25, one or both sidewalls 50 and 51 of the tire are turned inwards, and at least one of the tire beads 52 and 53 are inserted in at least one position along the circumference, preferably into the drop center of the rim 9. In this position the tire beads are retained on the rim 9 by means of a clamping device 26. This clamping device 26 includes movably clamping arms 27 and is intended to locate the upper and lower tire beads in the drop center 55 of the rim 9, with the clamp 26 supported on the tire 25 via an adjusting screw 28. The clamping device 26 could also be designed so that it is supported in the center bore of the rim 9, forcing the tire bead into the drop center 55 of the rim 9 by means of a radially movable arm, which is not shown in the drawing.

With the rim 9 clamped on, the adaptor 2 is adjusted such that the clamping device 26 is situated adjacent to the mounting head assembly 5. Then the mounting tool 14 is adjusted in horizontal and vertical directions to force the tire bead over the rim flange 17 of the tire 9.

Figure 3:
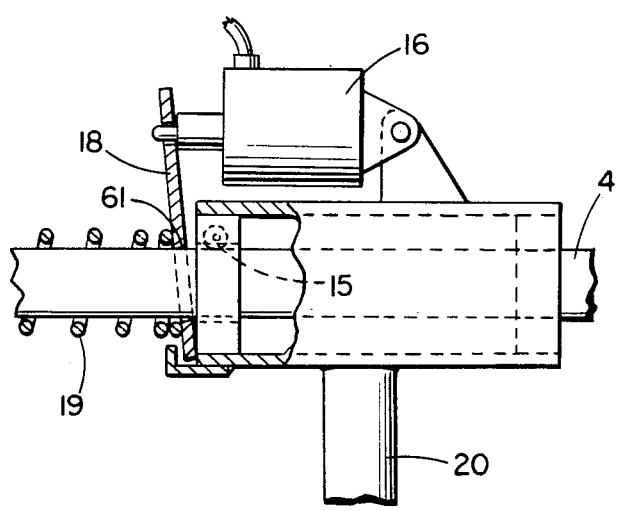
FIG. 3 is a close-up view of the cylinder and clamping plate associated with the mounting head assembly of the tire-mounting machine of FIG. 1.
Figure 4:
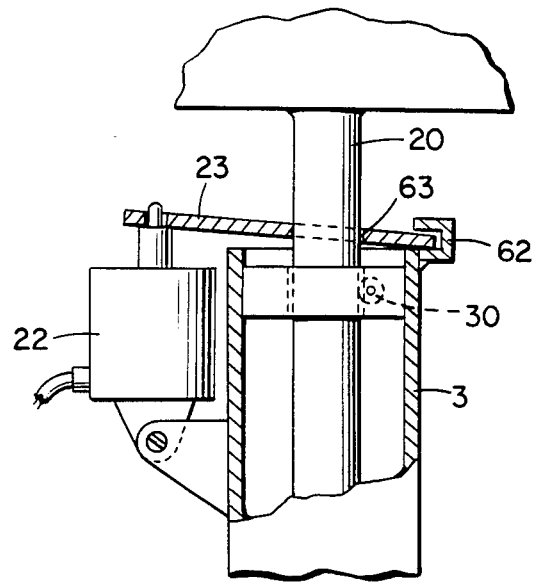
FIG. 4 is a close-up view of the cylinder and clamping plate associated with the vertical column of the tire-mounting machine of FIG. 1.

After adjustment of the mounting tool 14 the pressure cylinder 16 and the clamping cylinder 22 are operated so that the mounting tool 14 is locked into a position where it exerts initial stress on the rim flange 17 when the tool is pressed forward by the locking action of the clamping plates 18 and 23. With reference to FIG. 3, clamping plate 18 is shown in a position where it has been rotated from its initial position in FIG. 2 to its position in FIG. 3 in order to lock arm 4 within the aperture 61 defined in plate 18. FIG. 4 shows the locking action taking place between clamping plate 23, column 20, keeper 62 and aperture 63. In FIG. 4, clamping plate 23 has been rotated about keeper 62 in order to lock column 20 within the aperture 63 defined in plate 23. The initial stress thus exerted helps to compensate for eccentricity and lateral run-out of the rim 9 and any eccentric clamping of the rim 9 on the adaptor 2. Then the mounting tool 14 is driven by the drive unit 6 so that the clamped rim 9, together with the tire 25 placed thereupon, is moved along under the rotating mounting tool 14. As a result, the tire bead is rolled over the rim flange 17 into the drop center of the rim 9. In order to press the tire bead radially outwards into the drop center of the rim 9 when rolled over the rim flange 17, a torque difference between the driven mounting tool 14 and the rotating tire/rim assembly is required. This torque difference is obtained with the braking device 11, which is provided preferably at the lower extremity of the rim adaptor 2, and has, in particular, the form of a disc brake. The braking force is adjusted such that mounting will not involve any damage.

For better and easier mounting the axis of rotation of the mounting head assembly 5 is also inclined relative to the axis of rotation of the rim adaptor 2 and is in the direction of the rolling motion, as well, so that the tire bead is pushed even farther into the drop center 55 of the rim 9 and so that no deformations are produced on the tire bead circumference when the tire is nearly mounted. To do otherwise would make mounting rather difficult, if not impossible.

Figure 5:
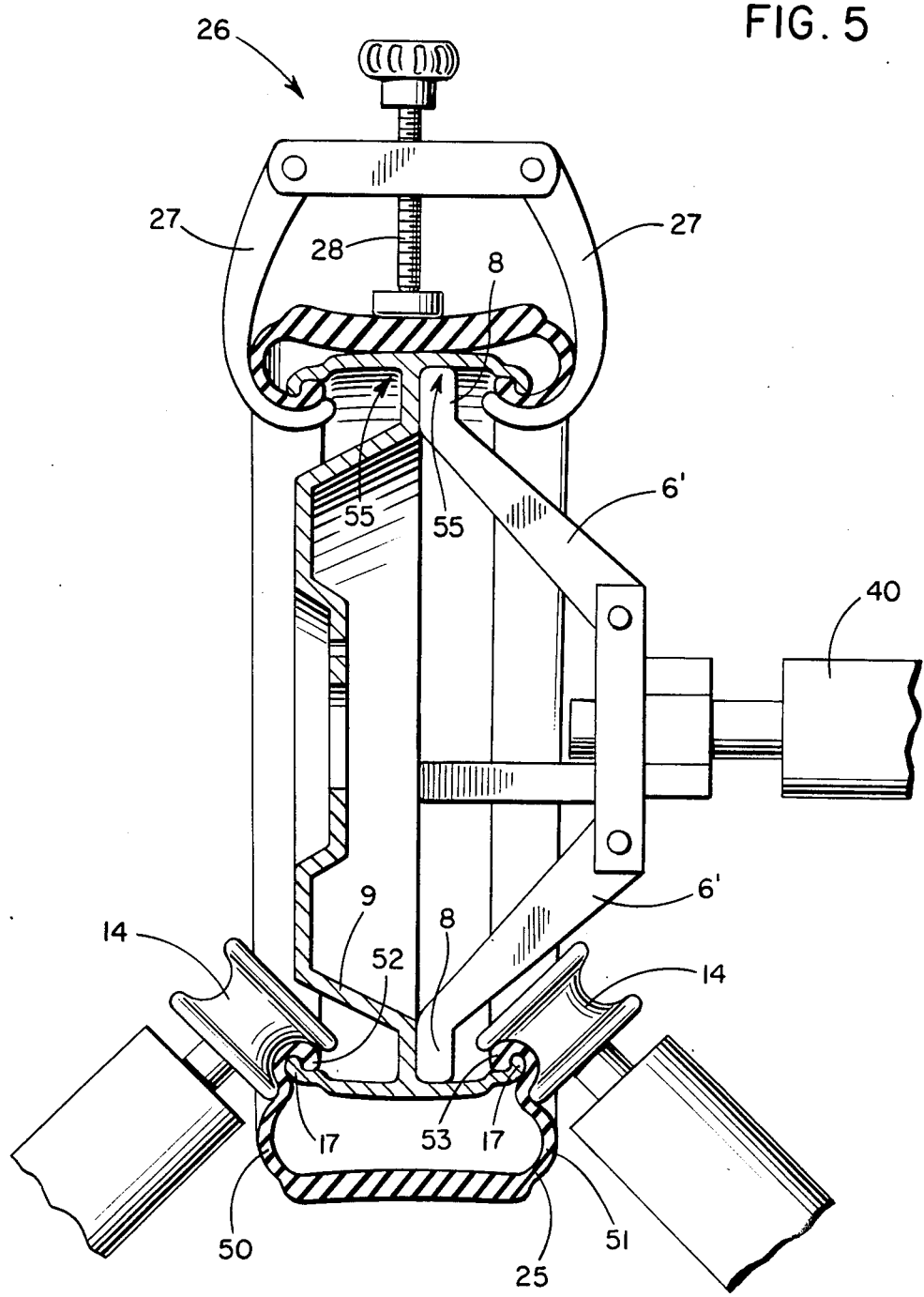
FIG. 5 is a cross section of a tire/rim assembly showing the arrangement of two mounting tools and a clamping device for simultaneously mounting both tire beads to the rim.

After the upper tire bead has been mounted onto the rim 9, the latter is unclamped, the wheel is turned over, clamped again, and the second tire bead 53 is mounted in the like manner. In order to expedite mounting, it is possible to use two mounting head assemblies which mount the upper and lower tire bead 52.53 simultaneously, but in opposite directions, as shown in FIG. 5, where the tire beads 52, 53 are positioned on the left and right side of the rim 9. When two mounting heads 5 are used, the wheel adaptor 2 may be arranged horizontally to hold the tire vertically. In this way, each mounting head assembly 5 and its associated adjustment structure may be conveniently located on either side of the tire. After mounting the tire, the wheel is inflated in known manner.

Obviously, many modifications and variations of the present invention are possible in light of the above teachings. It is, therefore, to be understood that, within the scope of the appended claims, the invention may be practiced otherwise than as specifically described.

What is claimed is:

1. A tire-mounting apparatus for mounting a tire having two beads on a rim in a tire/rim assembly where the rim has two opposed flanges that are bent radially inwards to define a drop center, and where the beads of the tire extend over the rim and are located behind the rim flanges in the drop center, said apparatus comprising:

a base;

rim-mounting means for rotatably mounting the rim to said base;

clamping means for retaining the beads of the tire on a radially inner side of the rim flanges;

mounting means having a mounting tool for forcing one of the tire beads over one of the rim flanges, into the drop center and radially outwards onto said radially inner side of the rim flanges while the beads of the tire are retained by the clamping means;

moving means for moving the tire and rim when the tire is in contact with the mounting tool and the beads are retained on said radially inner side of the rim flanges by said clamping means so that said one tire bead is rolled over said one rim flange, into the drop center of said rim and forced radially outwards onto said radially inner side of said one rim flange, said moving means including a drive unit for rotating said mounting tool against said tire to move said tire and rim; and braking means for counteracting the movement of said tire and rim by said moving means, said braking means including an assembly secured to said rim-mounting means.

2. The tire-mounting apparatus as set forth in claim 1, wherein said clamping means includes means for clamping the tire to the rim in at least one place.

3. The tire-mounting apparatus set forth in claim 2, wherein said clamping means includes means for clamping at least one of the tire beads to the rim in the drop center of said rim.

4. The mounting apparatus set forth in claim 3, wherein both of the beads of the tire are clamped to the rim in the drop center of said rim.

5. The tire-mounting apparatus as set forth in claim 3, in which the clamping means comprises a clamp supported on the tire in the middle of the tire tread.

6. The tire-mounting apparatus as set forth in claim 1, in which said mounting tool has the shape of a tapered roller.

7. The tire-mounting apparatus as set forth in claim 6, in which said mounting tool has the shape of a double-tapered roller.

8. The tire-mounting apparatus as set forth in claim 1, wherein the mounting means includes means for pressing said mounting tool forward in a generally horizontal direction against said one rim flange under fairly constant pressure.

9. The tire-mounting apparatus as set forth in claim 1, wherein the axis of rotation of the mounting means is inclined relative to the axis of rotation of said rim-mounting means.

10. The tire-mounting apparatus of claim 1, further comprising another mounting means having a second mounting tool for forcing the other tire bead over the other rim flange.

11. The tire-mounting apparatus of claim 10, further comprising another moving means for moving the tire and rim in contact with said second mounting tool so that said other tire bead is rolled over said other rim flange into the drop center of the rim.

12. The tire-mounting apparatus of claim 11, wherein said mounting tool and said second mounting tool are driven in opposite directions.

13. A tire-mounting apparatus for mounting a tire having two beads on a rim in a tire/rim assembly where the rim has two opposed flanges that are bent radially inwards to define a drop center, and where the beads of the tire extend over the rim and are located behind the rim flanges in the drop center, said apparatus comprising:
a base;
rim-mounting means for rotatably mounting the rim to said base;
clamping means for retaining the beads of the tire on a radially inner side of the rim flanges;
mounting means having a mounting tool for forcing one of the tire beads over one of the rim flanges, into the drop center and radially outwards onto said radially inner side of the rim flanges while the beads of the tire are retained by the clamping means, said mounting means including means for moving said mounting tool along a displacement axis that is equally spaced from the axis of rotation of said rim-mounting means, and said mounting means including a movable support column whose longitudinal axis coincides with said displacement axis, a clamping plate surrounding a portion of said column, and a pressure-cylinder means for urging said clamping plate into locking engagement with said column;
moving means for moving the tire and rim when the tire is in contact with the mounting tool and the beads are retained on said radially inner side of the rim flanges by said clamping means so that said one tire bead is rolled over said one rim flange, into the drop center of said rim and forced radially outwards onto said radially inner side of said one rim flange; and
locking means for locking said mounting means at a desired position along said displacement axis.

14. The tire-mounting apparatus of claim 13, wherein said mounting means includes a pressure cylinder for moving said mounting means along said displacement axis.

15. The tire-mounting apparatus of claim 14, wherein said mounting means includes means for operating said pressure cylinder at constant pressure to compensate for the weight of said mounting means.

16. A tire-mounting apparatus for mounting a tire having two beads on a rim in a tire/rim assembly where the rim has two opposed flanges that are bent radially inwards to define a drop center, and where the beads of the tire extend over the rim and are located behind the rim flanges in the drop center, said apparatus comprising:
a base;
rim-mounting means for rotatably mounting the rim to said base;
clamping means for retaining the beads of the tire on a radially inner side of the rim flanges;
mounting means having a mounting tool for forcing one of the tire beads over one of the rim flanges, into the drop center and radially outwards onto said radially inner side of the rim flanges while the beads of the tire are retained by the clamping means, said mounting means including means for moving said mounting tool along a displacement axis that is transverse to the axis of rotation of said rim-mounting means;
moving means for moving the tire and rim when the tire is in contact with the mounting tool and the beads are retained on said radially inner side of the rim flanges by said clamping means so that said one tire bead is rolled over said one rim flange, into the drop center of said rim and forced radially outwards onto said radially inner side of said one rim flange;
locking means for locking said mounting means at a desired position along said displacement axis; and
said mounting means including a movable, elongated arm on one end of which said mounting tool is mounted, said movable arm having a longitudinal axis that coincides with said displacement axis, and wherein said locking means includes a clamping plate surrounding a portion of said arm, and a pressure-cylinder means for urging said clamping plate into locking engagement with said arm.

17. The tire-mounting apparatus as set forth in claim 16, wherein said mounting means includes a hydraulic cylinder for moving said mounting means along said displacement axis.

18. The tire-mounting apparatus as set forth in claim 16, further comprising spring means for placing said arm in an initial position when said locking means is not engaged.

* * * * *